United States Patent

[11] 3,604,395

| [72] | Inventor | Stanley C. Huslin<br>1503 Foulkrod St., Philadelphia, Pa. 19124 |
|---|---|---|
| [21] | Appl. No. | 831,839 |
| [22] | Filed | June 10, 1969 |
| [45] | Patented | Sept. 14, 1971 |

[54] HATCHERY FOR BRINE SHRIMP EGGS OR THE LIKE
2 Claims, 3 Drawing Figs.

| [52] | U.S. Cl. | 119/2 |
|---|---|---|
| [51] | Int. Cl. | A01k 61/00 |
| [50] | Field of Search | 119/2, 3, 5 |

[56] References Cited
UNITED STATES PATENTS

| 2,008,363 | 7/1935 | Maris | 119/5 |
|---|---|---|---|
| 2,920,606 | 1/1960 | Anderson | 119/2 |
| 2,984,207 | 5/1961 | Drake | 119/2 |
| 3,086,497 | 4/1963 | Novello | 119/2 |
| 3,149,608 | 9/1964 | Murphy | 119/5 |
| 3,261,471 | 7/1966 | Halpert | 210/169 |

Primary Examiner—Aldrich F. Medbery
Attorney—Seidel and Gonda

ABSTRACT: Apparatus is disclosed for hatching the eggs of aquatic animals such as brine shrimp or the like. In a presently preferred form, the apparatus comprises a water impervious vessel having the shape of an inverted cone, means for supporting the vessel with its apex disposed downwardly, air outlet means disposed in the vessel adjacent its apex, and conduit means in fluid communication with the air outlet for supplying air to the diffuser and the interior of the vessel.

PATENTED SEP 14 1971 3,604,395
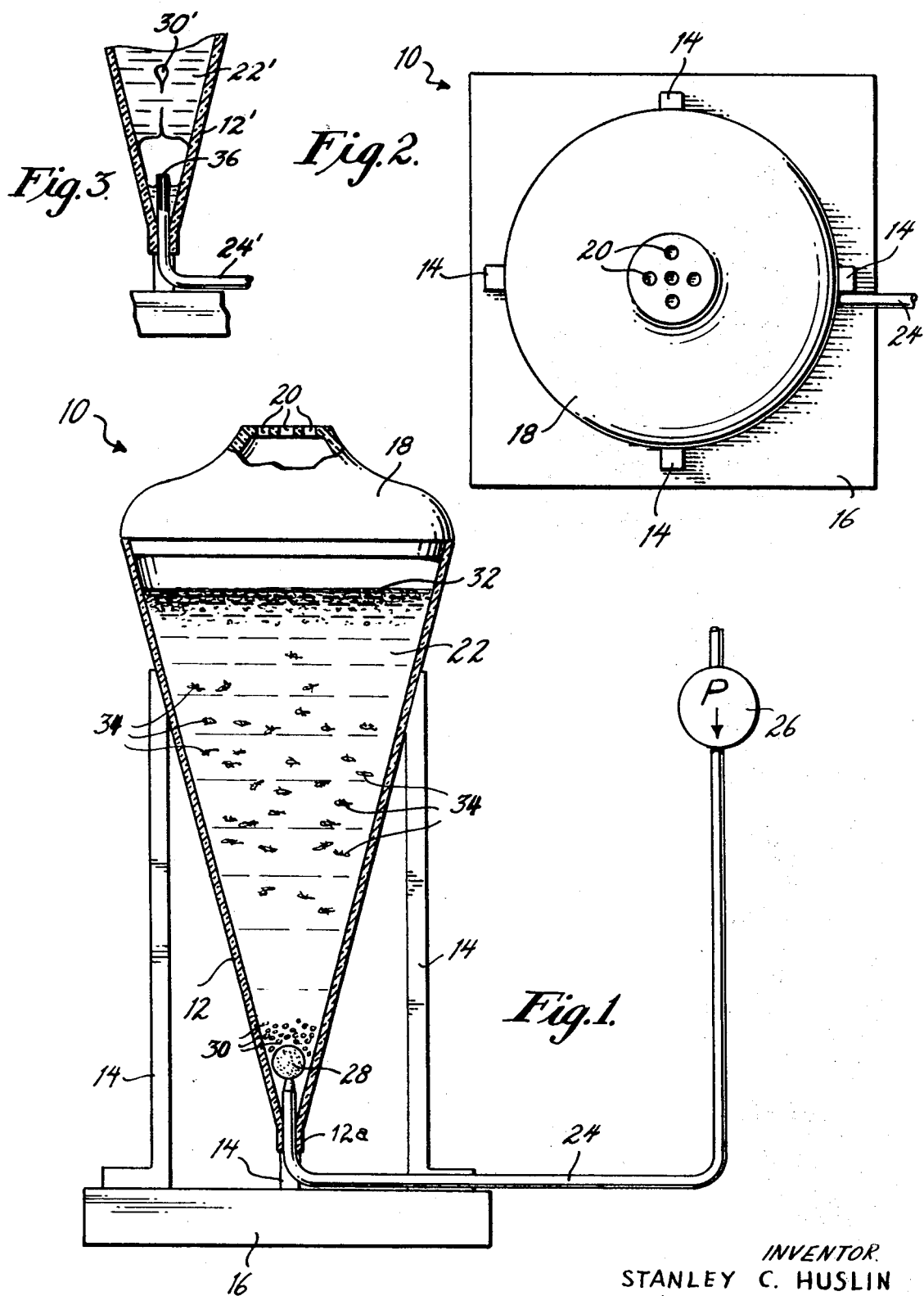
INVENTOR.
STANLEY C. HUSLIN
BY Seidel, Gonda & Goldhammer
ATTORNEYS

HATCHERY FOR BRINE SHRIMP EGGS OR THE LIKE

This invention relates to a hatchery for brine shrimp eggs or the like, and more particularly, to apparatus wherein dried eggs of organisms such as brine shrimp may be incubated and prepared for use as food in aquaria.

It is desirable, in the care of aquarium fishes, to provide live food at least on a periodic basis. One form of live food commonly used is the crustacean known as brine shrimp*

* Artemia Salina. Brine shrimp eggs are available commercially in dried, storable form. Such eggs may be hatched when desired by placing them in saline solution at room temperature. Typically, the eggs hatch in about 48 hours, depending on conditions of temperature and aeration, and yield baby brine shrimp about 0.2 mm. long.

It is known that aeration of the saline solution improves the yield of brine shrimp from a given batch of eggs. Consequently, aquarists have heretofore hatched brine shrimp eggs with the aid of aeration.

Conventional aeration apparatus includes a pump, in fluid communication with a diffuser, such as a porous carborundum stone known generally as an "airstone." In conventional practice, the eggs and airstone are placed in an ordinary glass jar or other conventional vessel.

The above-described conventional incubation technique results in a low yield of brine shrimp in relation to the number of eggs in the solution. This is due to the fact that the eggs normally lie in a pile at the bottom of the vessel. Relatively few are exposed to circulation of the liquid and the effects of aeration. A principal object of the present invention is to provide an apparatus wherein substantially all of the eggs placed in a hatchery are subjected to agitation and aeration, thereby increasing the yield of brine shrimp.

Another object is to provide a relatively simple and easily used apparatus for hatching the eggs of brine shrimp or the like.

Other objects will appear hereinafter.

For the purpose of illustrating the invention, there are shown in the drawings forms which are presently preferred; it being understood, however, that this invention is not limited to the precise arrangements and instrumentalities shown.

FIG. 1 is a side elevation view, partly in section, showing an apparatus in accordance with the invention.

FIG. 2 is a top plan view of the apparatus.

FIG. 3 is a partial side elevation view showing a modified form of the invention.

Referring now to the drawings in detail, wherein like numerals indicate like elements, there is seen in FIG. 1 an apparatus designated generally by the reference numeral 10. The apparatus 10 includes a water impervious vessel 12, whose shape is or approximates that of an inverted cone. The vessel 12 may be described as generally conical, in the sense that its profile widens from a relatively small apex having a conduit receiving the neck portion 12a to an upper portion of greater cross-sectional area than portions adjacent the apex. In the illustrated form, the vessel 12 is a straight sided right circular cone.

Means are provided for supporting the vessel 12 in its operative position. For example, the illustrated legs 14, which extend upwardly from a base 16, engage the sides of the vessel 12, and maintain the vessel in its operative position.

The vessel 12 is preferably provided with a cover member 18, complemental with and adapted to overlie its open upper end. The cover 18 is provided with openings 20, the purpose of which will be explained later.

As is apparent from FIG. 1, the vessel 12 may receive and retain a liquid medium, such as a saline solution 22 simulating sea water.

An important aspect of the invention is the manner in which air is introduced into the solution 22 and vessel 12. For this purpose, there is provided a conduit 24, which in the illustrated embodiment of the invention, passes through the neck portion 12a and is received through the apex of the vessel 12. In fluid communication with one end of the conduit 24 is an air pump 26, of any conventional construction. An air outlet means 28 is provided within the vessel 12. In the illustrated embodiment, the air outlet means 28 is a diffuser in the form of a spherical airstone. Thus, pressurized air provided by the pump 26 passes through the conduit 24, and exits adjacent the apex of the vessel 12 through the airstone outlet means 28. Air introduced into the vessel 12 through the outlet means 28 passes through the solution 22 as of fine bubbles 30, and exits the vessel 12 through the above-mentioned openings 20.

Passage of the air through the solution 22, it has been found, establishes vortices, which move upwardly along the walls of the vessel 12. Such vortices provide agitation of the solution 22. Thus, eggs placed in the solution 22 are subjected to constant agitation, as well as aeration by bubbles of air passing through the solution 22.

The solution 22 is continuously aerated during the incubation period.

Bubbles 30 emerging from the outlet means 28 tend to entrain individual eggs, not shown, thereby ensuring positive agitation.

After the eggs have hatched, the pump 26 is shut off. The shells and other debris 32 from the hatched eggs, tend to rise to the surface of the solution. Nonhatched eggs tend to fall to the bottom between the air stone and the side of the vessel. The hatched shrimp 34 swim freely within the solution 22. The solution 22, with the shrimp 34, can then be syphoned off, and the shrimp 34 introduced to the aquarium as food.

In the modified form of the invention, seen in FIG. 3, the air outlet means has an opening 36 in the end of the conduit 24. Air exiting the outlet means 28 forms bubbles 30' which pass upwardly through the solution 22'.

The present invention may be embodied in other specific forms without departing from the spirit or essential attributes thereof.

I claim:

1. Apparatus for hatching eggs of aquatic animals comprising a water impervious vessel, said vessel being comprised of a downwardly and inwardly converging sidewall to define a conical hatching chamber, said conical hatching chamber including an apex at its lower end, said apex defining an opening with its axis disposed substantially along the longitudinal axis of said conical hatching chamber, the sidewall of said opening meeting said converging neck portion of said sidewall of said vessel, elongated conduit means having first and second ends, one of said ends being received in said neck portion opening in watertight relation, said one end extending upwardly into said conical hatching chamber, an enlarged porous member supported on said one end, said enlarged porous member being disposed in spaced close proximity with respect to said converging sidewalls to define a means for receiving and permitting unhatched eggs to fall to the bottom of said conical hatching chamber between its wall and said enlarged porous member and said conduit.

2. Apparatus as defined in claim 1 including a support platform, means interconnected between said support platform and said conical hatching chamber for holding said conical hatching chamber so that said apex is spaced from said support platform, means for forcing air through said conduit, said one end and said enlarged porous member to create air bubbles in said conical hatching chamber, a cover for said conical hatching chamber, said cover having substantially the same cross section as the end of said conical chamber remote from said apex for being mounted thereon, and said cover is provided with a plurality of apertures so that air entering said conical hatching chamber through said one end of said conduit and said enlarged porous member can escape to the atmosphere.